(12) United States Patent
Smith et al.

(10) Patent No.: US 12,436,959 B2
(45) Date of Patent: Oct. 7, 2025

(54) APPARATUS AND METHODS FOR GENERATING AN INSTRUCTION SET FOR A USER

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

(*) Notice: Subject to any disclaimer, the term of this patent is extended or adjusted under 35 U.S.C. 154(b) by 0 days.

(21) Appl. No.: 18/816,376

(22) Filed: Aug. 27, 2024

(65) Prior Publication Data

US 2024/0419673 A1    Dec. 19, 2024

Related U.S. Application Data

(63) Continuation of application No. 18/242,251, filed on Sep. 5, 2023, now Pat. No. 12,130,825, which is a continuation of application No. 18/141,445, filed on Apr. 30, 2023, now Pat. No. 11,836,143.

(51) Int. Cl.
    *G06F 16/00*      (2019.01)
    *G06F 16/2457*    (2019.01)
    *G06F 16/28*      (2019.01)

(52) U.S. Cl.
    CPC ...... *G06F 16/24578* (2019.01); *G06F 16/285* (2019.01)

(58) Field of Classification Search
    CPC .................... G06F 16/24578; G06F 16/285
    USPC ........................................................ 707/722
    See application file for complete search history.

(56) References Cited

U.S. PATENT DOCUMENTS

| | | | | |
|---|---|---|---|---|
| 9,800,483 | B2* | 10/2017 | Williams | H04L 41/0896 707/707 |
| 10,339,560 | B2 | 7/2019 | Bafna | |
| 10,902,351 | B1* | 1/2021 | Neumann | G06N 20/00 707/707 |
| 11,392,857 | B1* | 7/2022 | Dohrn | G06Q 10/08355 707/707 |
| 2015/0220999 | A1 | 8/2015 | Thornton | |
| 2018/0350015 | A1 | 12/2018 | Gordon | |
| 2021/0004715 | A1* | 1/2021 | Neumann | G16H 40/63 707/707 |

(Continued)

*Primary Examiner* — Alexandria Y Bromell
(74) *Attorney, Agent, or Firm* — Caldwell Intellectual Property Law

(57) ABSTRACT

An apparatus and method for generating an instruction set for a user is provided. The apparatus includes at least a processor and a memory connected to the processor. The memory contains instructions configuring the at least a processor to receive a client datum from a client, where the client datum describes resources of the client, and to receive a user datum from the user, where user datum includes a target datum that describes resource transfer data from the client to the user. Initiation of resource transfer described by the target datum is triggered by the pattern exceeding a threshold. In addition, the memory contains instructions configuring the at least a processor to generate an interface query data structure including an input field and to display the first transfer datum and the second transfer datum hierarchically based on a user-input datum input to the input field.

18 Claims, 8 Drawing Sheets

(56) References Cited

U.S. PATENT DOCUMENTS

| | | | |
|---|---|---|---|
| 2021/0049514 A1* | 2/2021 | Neumann | G06F 18/24 707/707 |
| 2021/0057077 A1* | 2/2021 | Neumann | G16H 20/60 707/707 |
| 2021/0098099 A1* | 4/2021 | Neumann | G06N 20/00 |
| 2023/0262103 A1* | 8/2023 | Specter | G06F 16/61 709/219 |

* cited by examiner

APPARATUS AND METHODS FOR GENERATING AN INSTRUCTION SET FOR A USER

CROSS-REFERENCE TO RELATED APPLICATIONS

This application is a continuation of Non-provisional application Ser. No. 18/242,251 filed on Sep. 5, 2023 and entitled "APPARATUS AND METHODS FOR GENERATING AN INSTRUCTION SET FOR A USER," which is a continuation of Non-provisional application Ser. No. 18/141,445 filed on Apr. 30, 2023, now U.S. Pat. No. 11,836,143, issued on Dec. 5, 2023, and entitled "APPARATUS AND METHODS FOR GENERATING AN INSTRUCTION SET FOR A USER," both of which the entirety of each application is herein incorporated by reference.

FIELD OF THE INVENTION

The present invention generally relates to the field of resource management regarding timely repayment for services rendered. In particular, the present invention is directed to an apparatus and methods for data processing for generating an instruction set for a user.

BACKGROUND

Current data processing or digital resource management techniques tend to focus on general behavior descriptions, rather classifying client repayment behavior categorized into multiple categories and further defined by a triggering event. Prior programmatic attempts to resolve these and other related issues have suffered from inadequate user-provided data intake and subsequent processing capabilities.

SUMMARY OF THE DISCLOSURE

In an aspect, an apparatus for generating an instruction set for a user is provided. The apparatus includes at least a processor. A memory is connected to the processor. The memory contains instructions configuring the at least a processor to receive a client datum from a client. The client datum describes resources of the client. In addition, the memory contains instructions configuring the at least a processor to receive a user datum from the user. The user datum includes a target datum that describes resource transfer data from the client to the user. Initiation of resource transfer described by the target datum is triggered by the pattern exceeding a threshold. In addition, the memory contains instructions configuring the at least a processor to classify the client datum and the user datum to a plurality of categories, calculate the target datum based on classification of the client datum and the user datum to the plurality of categories. Still further, a remote display device to display the instruction set including displaying the transfer datum the instruction set is further configured to generate strategy recommendation as a function of at least the target datum wherein the strategy recommendation comprises at least a skill recommendation.

In another aspect, a method for generating an instruction set for a user is provided. The method includes receiving, by a computing device, a client datum from a client. The client datum describes resources of the client. The method includes receiving, by the computing device, a user datum from the user, the user datum including a target datum that describes resource transfer data from the client to the user. The method includes classifying, by the computing device, the client datum, and the user datum to a plurality of categories. The method includes calculating, by the computing device, the target datum based on classification of the client datum and the user datum to the plurality of categories. The user-input datum describes data for selecting a preferred attribute of transfer data associated with one or more instances of rankings of the transfer datum. In addition, a remote display device to display the instruction set including displaying the transfer datum the instruction set is further configured to generate strategy recommendation as a function of at least the target datum wherein the strategy recommendation comprises at least a skill recommendation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
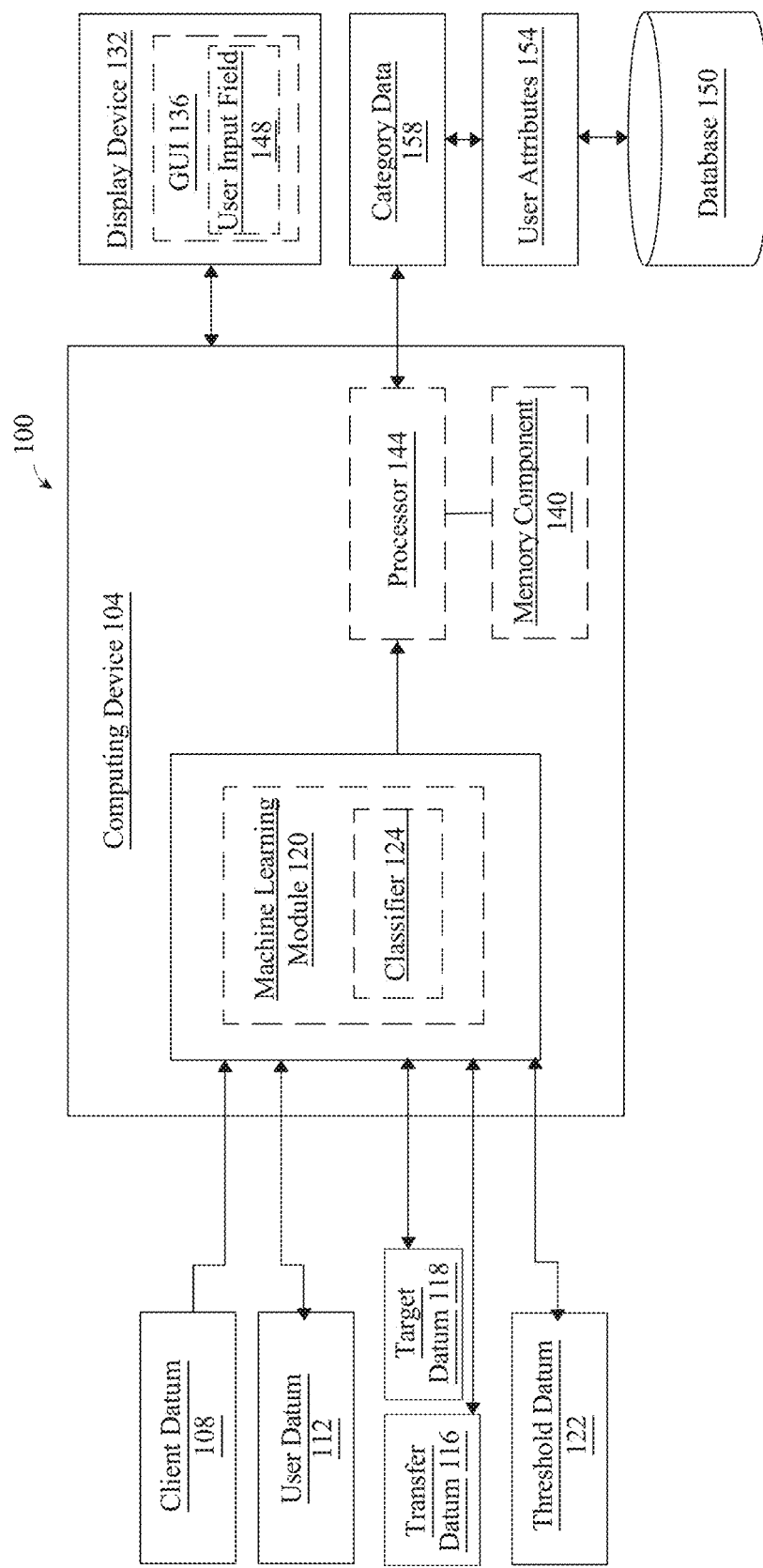
FIG. 1 is a block diagram of an embodiment of an apparatus for generating an instruction set for a user.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for generating an instruction set for a user. Described processes are executed by a computing device including a processor, which is configured to execute any one or more of the described steps. A memory is connected to the processor and contains instructions configuring the processor to receive a client datum from a client. The client datum describes resources of the client and a pattern that is representative of client interaction with the user. In addition, the memory contains instructions configuring the at least a processor to receive a user datum from the user. The user datum includes a target datum that describes resource transfer data from the client to the user. Initiation of resource transfer described by the target datum is triggered by the pattern exceeding a threshold. In addition, the memory contains instructions configuring the at least a processor to classify the client datum and the user datum to a plurality of categories, calculate the target datum based on classification of the client datum and the user datum to the plurality of categories, and identify a first transfer datum and at least a second transfer datum from transfer data. Refining at least the first transfer datum includes classifying at least the first transfer datum to the target datum and ranking the first transfer datum and the second transfer datum relative to the target datum.

In addition, the memory contains instructions configuring the at least a processor to generate an "interface query data structure" including an input field based on ranking the first transfer datum and the second transfer datum. An "interface query data structure," as used in this disclosure, is an example of data structure used to "query," such as by digitally requesting, for data results from a database and/or for action on the data. "Data structure," in the field of computer science, is a data organization, management, and storage format that is usually chosen for efficient access to data. More particularly, a "data structure" is a collection of data values, the relationships among them, and the functions or operations that can be applied to the data. Data structures also provide a means to manage relatively large amounts of data efficiently for uses such as large databases and internet indexing services. Generally, efficient data structures are essential to designing efficient algorithms. Some formal design methods and programming languages emphasize data structures, rather than algorithms, as an essential organizing factor in software design. In addition, data structures can be used to organize the storage and retrieval of information stored in, for example, both main memory and secondary memory.

Therefore, "interface query data structure," as used herein, refers to, for example, a data organization format used to digitally request a data result or action on the data. In addition, the "interface query data structure" can be displayed on a display device, such as a digital peripheral, smartphone, or other similar device, etc. The interface query data structure may be generated based on received "user data," defined as including historical data of the user. Historical data may include attributes and facts about a user that are already publicly known or otherwise available, such as quarterly earnings for publicly traded businesses, or health and/or personal training specifics in the context of physical performance training, etc. In some embodiments, interface query data structure prompts may be generated by a machine-learning model. As a non-limiting example, the machine-learning model may receive user data and output interface query data structure questions.

Accordingly, as used herein, the interface query data structure configures a remote display device to display the input field to the user and receive at least a user-input datum into the input field. The user-input datum describes data for selecting a preferred attribute of transfer data associated with one or more instances of rankings of the first transfer datum and the second transfer datum. Still further, the interface query data structure configures a remote display device to display the instruction set including displaying the first transfer datum and at least the second transfer datum hierarchically based on the user-input datum.

Referring now to FIG. 1, an exemplary embodiment of apparatus 100A for providing a customized skill factor datum to a user. In one or more embodiments, apparatus 100 includes computing device 104, which may include without limitation a microcontroller, microprocessor (also referred to in this disclosure as a "processor"), digital signal processor (DSP) and/or system on a chip (SoC) as described in this disclosure. Computing device 104 may include a computer system with one or more processors (e.g., CPUs), a graphics processing unit (GPU), or any combination thereof. Computing device 104 may include a memory component, such as memory component 140, which may include a memory, such as a main memory and/or a static memory, as discussed further in this disclosure below. Computing device 104 may include a display component (e.g., display device 132, which may be positioned remotely relative to computing device 104), as discussed further below in the disclosure. In one or more embodiments, computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks, as described below, across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104A may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to receive at least an element of client datum 108, which may include data describing current preferences relating to achieving a target by the user. For the purpose of this disclosure, a "client datum" is an element, datum, or elements of data client information, payment, and/or the like. Accordingly, the client datum may describe various resources (e.g., monetary, land, intellectual property, and other forms of intangible assets and the like) of the client and a pattern that is representative of client interaction with the user (as introduced earlier). In some embodiments, client datum 108 may be input into computing device 104 manually by the client, who may be associated with any type or form of establishment (e.g., a business, university, non-profit, charity, etc.), or may be an independent entity (e.g., a solo proprietor, an athlete, an artist, etc.). In some instances, client datum 108 may be extracted from a business profile, such as that May be available via the Internet on LinkedIn®, a business and employment-focused social media platform that works through websites and mobile apps owned my Microsoft® Corp., of Redmond, WA). More particularly, such a business profile may include the past achievements of a user in various fields such as business, finance, and personal, depending on one or more particular related circumstances. Persons skilled in the art, upon reviewing the entirety of this disclosure, will be aware of various other ways or situations in which client datum 108 may be input, generated, or extracted for various situations and goals. For example, in an example where the client is a business, client datum 108 may be extracted from or otherwise be based on the client's business profile, which may include various business records such as financial records, inventory record, sales records, and the like. In addition, in one or more embodiments, client datum 108 may be generated by evaluating interactions with external entities, such as third parties. More particularly, in a business-related context, such an example external entity (or third party) may be that offered by Moody's Investors Services, Inc., Moody's Analytics, Inc. and/or their respective affiliates and licensors, of New York, NY. Services rendered may include providing international financial research on bonds issued by commercial and government entities, including ranking the creditworthiness of borrowers using a standardized ratings scale which measures expected investor loss in the event of default. In such an example, client datum 108 extracted from such an external entity may include ratings for debt securities in several bond market segments, including government, municipal and corporate bonds, as well as various managed investments such as money market funds and fixed-income funds and financial institutions including banks and non-bank finance companies and asset classes in structured finance.

In addition, or the alternative, in one or more embodiments, client datum 108 may be acquired using web trackers or data scrapers. As used herein, "web trackers" are scripts (e.g., programs or sequences of instructions that are interpreted or carried out by another program rather than by a computer) on websites designed to derive data points about user preferences and identify. In some embodiments, such web trackers may track activity of the user on the Internet. Also, as used herein, "data scrapers" are computer programs that extract data from human-readable output coming from another program. For example, data scrapers may be programmed to gather data on user from user's social media profiles, personal websites, and the like. In some embodiments, client datum 108 may be numerically quantified (e.g., by data describing discrete real integer values, such as 1, 2, 3 . . . n, where n=a user-defined or prior programmed maximum value entry, such as 10, where lower values denote lesser significance relating to favorable business operation and higher values denote greater significance relating to favorable business operation). For example, for classifying at least an element describing a pattern of client datum 108 (e.g., of a business) to target datum 118 in the context of fiscal integrity in financial services and retirement planning, client datum 108 may equal "3" for a business, such as an investment bank stock or mutual fund share, etc., suffering from credit liquidity problems stemming from a rapidly deteriorating macroeconomic environment and/or poor quality senior management, a "5" for only matching industry peers, and an "8" for significantly outperforming industry peers, etc.

Other example values are possible along with other exemplary attributes and facts about a client (e.g., a business entity, or an aspiring athlete) that are already known and may be tailored to a particular situation where explicit business guidance (e.g., provided by the described progression sequence) is sought. In one or more alternative embodiments, client datum 108 may be described by data organized in or represented by lattices, grids, vectors, etc., and may be adjusted or selected as necessary to accommodate particular client-defined circumstances or any other format or structure for use as a calculative value that a person skilled in the art would recognize as suitable upon review of the entirety of this disclosure.

In one or more embodiments, client datum 108 may be provided to or received by computing device 104 using various means. In one or more embodiments, client datum 108 may be provided to computing device 104 by a business, such as by a human authorized to act on behalf of the business including any type of executive officer, an authorized data entry specialist or other type of related professional, or other authorized person or digital entity (e.g., software package communicatively coupled with a database storing relevant information) that is interested in improving and/or optimizing performance of the business overall, or in a particular area or field over a defined duration, such as a quarter or six months. In some examples, a human may manually enter client datum 108 into computing device 104 using, for example, user input field 148 of graphical user interface (GUI) 136 of display device 132. For example, and without limitation, a human may use display device 132 to navigate the GUI 136 and provide client datum 108 to computing device 104. Non-limiting exemplary input devices include keyboards, joy sticks, light pens, tracker balls, scanners, tablet, microphones, mouses, switches, buttons, sliders, touchscreens, and the like. In other embodiments, client datum 108 may be provided to computing device 104 by a database over a network from, for example, a network-based platform. Client datum 108 may be stored, in one or more embodiments, in database 150 and communicated to computing device 104 upon a retrieval request from a human and/or other digital device (not shown in FIG. 1) communicatively connected with computing device 104. In other embodiments, client datum 108 may be communicated from a third-party application, such as from a third-party application on a third-party server, using a network. For example, client datum 108 may be downloaded from a hosting website for a particular area, such as a networking group for small business owners in a certain city, or for a planning group for developing new products to meet changing client expectations, or for performance improvement relating to increasing business throughput volume and profit margins for any type of business, ranging from smaller start-ups to larger organizations that are functioning enterprises. In one or more embodiments, computing device 104 may extract client datum 108 from an accumulation of information provided by database 150. For instance, and without limitation, computing device 104 may extract needed information database 150 regarding improvement in a particular area sought-after by the business and avoid taking any information determined to be unnecessary. This may be performed by computing device 104 using a machine-learning model, which is described in this disclosure further below.

At a high level, and as used herein, "machine-learning" describes a field of inquiry devoted to understanding and building methods that "learn"—that is, methods that leverage data to improve performance on some set of defined tasks. Machine-learning algorithms may build a machine-learning model based on sample data, known as "training data", to make predictions or decisions without being explicitly programmed to do so. Such algorithms may function by making data-driven predictions or decisions by building a mathematical model from input data. These input data used to build the machine-learning model may be divided in multiple data sets. In one or more embodiments, three data sets may be used in different stages of the creation of the machine-learning model: training, validation, and test sets.

Described machine-learning models may be initially fit on a training data set, which is a set of examples used to fit parameters. Here, example training data sets suitable for preparing and/or training described machine-learning processes may include data relating to historic business operations under historic circumstances, or circumstances in certain enumerated scenarios, such as during a period low interest rates or relatively easy bank lending, or during a period of highly restrictive fiscal policy implemented to control and address undesirably high inflation. Such training sets may be correlated to similar training sets of user attributes 154 relating to particular attributes of the user. In the described example of client datum 108 relating to a business, user attributes 154 may describe one or more elements, datum, data and/or attributes relating to client engagement with services provided by the user. For example, a business may require financing to launch and can approach a bank (e.g., a type of user) for one or more types of loans. In this example, user attributes 154 may describe or relate to data describing retail, regional, or even investment banks. In addition, user attributes may include data describing liquidity available to customers (e.g., clients) and performance of outstanding loans and other products. In addition, client datum 108 may include data describing a pattern of activity or conduct undertaken by the client regarding acquisition of goods or services from the user, depending on, for example, repayment behavior of the client to the user for services rendered by the user to the client. In banking, that may mean that the client will assess risk in relatively difficult macroeconomic conditions as dictated by higher-than-average federal interest rates, etc.

In addition, in one or more embodiments, computing device 104 is configured to receive at least an element of user datum 112. For the purpose of this disclosure, a "user datum" is an element, datum, or elements of data describing an amount of payment that the user wants to get from the client (e.g., for services the user rendered to the client, etc.). In addition, user datum 112 may describe user information, work habits, skill, client relationships, and the like. Further, in some embodiments, the user datum includes a target datum that at least generally describes resource transfer data from the client to the user. For example, such resource transfer data may include descriptions of repeat monetary payments from the client to the user over a specified duration relating to compensation for services rendered. In other circumstances, such user datum 112 implementing additional organizational structure, offering different services or products reflective of ongoing changes in client preferences, or other changes in existing services or products, management of resources, and the like. More particularly, in some instances, the "user datum" may be alternatively referred to as a "service provider datum" and thereby also be based on data describing practical implementation of ideas that result in the introduction of new goods or services or improvement in offering goods or services. Identification of user datum 112 May use a machine-learning model to analyze, for example, a pattern demonstrated by the user regarding achieving target datum 118, as also indicated by client datum 108.

In addition, in one or more embodiments, computing device 104 is configured to receive at least an element of transfer datum 116. For the purpose of this disclosure, a "transfer datum" is an element, datum, or elements of data describing resource, material, and/or monetary transfer from the client to the user for services rendered by the user to the client. For example, transfer datum 116 may describe one or more periodic monetary payments made by the client, such as a business or an aspiring athlete, to a user, such as a service provider including a bank or a personal trainer, etc. In addition, described processes may aggregate multiple instances of transfer datum 116 to generate resource transfer data, which may chronologically track payment or repayment behavior from the client to the user.

More particularly, transfer datum 116 may be generated by computing device 104 (as to be further described below) as a function of client datum 108 and/or user datum 112. In the context of banking, transfer datum 116 may describe routine repayments, such as by a mortgagor (e.g., borrower) to the mortgagee (e.g., lender). In the context of banking in challenging macroeconomic circumstances as dictated by higher-than-expected federal interest rates, transfer datum 116 may be reflect reductions in repayment from a maximum, or expected amount, or a minimum amount to prevent the account from going into collections.

More particularly, in some embodiments, generating transfer datum 116 as a function of user datum 112 may include digitally assessing one or more categories of relating to repayment behavior the client demonstrated in response to various surrounding circumstances, such as macroeconomic conditions. In addition, one or more instances of transfer datum 116 may be classified, by classifier 124 of machine-learning module 120 executed by processor 144, to client datum 108 and/or user datum 112.

Accordingly, concepts relating to transfer, such as periodic monetary transfer, can be quantified by one or more elements, datum or data and thereby processed by "machine-learning processes" executed by machine-learning module 120 of computing device 104 to, for example, be evaluated prior to display of multiple instances of transfer datum 116 (e.g., a first transfer datum and at least a second transfer datum, each respectively describing, for a payment) hierarchically based on at least user-input datum 224A in user input field 148. More particularly, and as described further herein with relation to FIG. 4, a "machine-learning process," as used in this disclosure, is a process that automatedly uses training data to generate an algorithm that will be performed by a computing device/module (e.g., computing device 104 of FIG. 1) to produce outputs given data provided as inputs. Any machine-learning process described in this disclosure may be executed by machine-learning module 120 of computing device 104 to manipulate and/or process transfer datum 116 relating to describing instances or characteristics of confidence for the user.

"Training data," as used herein, is data containing correlations that a machine-learning process may use to model relationships between two or more categories of data elements. For instance, and without limitation, training data, in this instance, may include multiple data entries, each entry representing a set of data elements that were recorded, received, and/or generated together and described various confidence levels or traits relating to demonstrations of confidence. Data elements may be correlated by shared existence in a given data entry, by proximity in a given data entry, or the like. Multiple categories of data elements may be related in training data according to various correlations, which may indicate causative and/or predictive links between categories of data elements, which may be modeled as relationships such as mathematical relationships by machine-learning processes as described in further detail below. In addition, training data may be formatted and/or organized by categories of data elements, for instance by associating data elements with one or more descriptors corresponding to categories of data elements.

For instance, a supervised learning algorithm (or any other machine-learning algorithm described herein) may include one or more instances of transfer datum 116 describing confidence of a user as described above as inputs. Accordingly, computing device 104 of FIG. 1 may receive user-input datum 224A into input field 148 of display device 132. User-input datum 224A may describe data for selecting a preferred attribute (e.g., pay off the full amount of an outstanding credit card balance, pay off a minimum required amount, pay an intermediary amount, etc.) of repayment behavior described by, for example transfer datum 116. In addition, in some embodiments, either the client or the user may dictate target datum 118, which may be, for example, either a maximum repayment amount permitted (e.g., typically the entirety of the outstanding balance), a minimum required payment (e.g., a minimum monthly repayment as dictated by a credit card member agreement, etc.). Classifier 124 of machine-learning module 120 may classify one or more instances of transfer datum 116 relative to, for example, target datum 118 (e.g., also in the context of confidence, such as achieving an optimum confidence level). Accordingly, in some embodiments, classifier 124 may classify instances of transfer datum 116 that more closely relate to or resemble target datum 118 within a closer proximity to target datum 118.

In addition, in one or more embodiments, initiation of resource transfer described by the target datum may be triggered in response to a pattern representative of client interaction with the user exceeding threshold datum 122. That is, in the context of personal training, threshold datum 122 occur after two initial complimentary sessions. Accordingly, billing from the gym to the aspiring athlete will initiate upon start of the third session between the aspiring athlete and the personal training. The third session, in this context, is the threshold triggering initiation of resource transfer from the client (e.g., the aspiring athlete) to the user (e.g., the gym).

In this way, a scoring function representing a desired form of relationship to be detected between inputs and outputs may be used by described machine learning processes. Such as scoring function may, for instance, seek to maximize the probability that a given input (e.g., data describing perseverance relating to confidence) and/or combination of elements and/or inputs (e.g., data describing confidence overall) is associated with a given output (e.g., hierarchical display of multiple instances of transfer datum 116 describing confidence) to minimize the probability that a given input (e.g., data describing potential over-confidence or recklessness) is not associated with a given output (e.g., additional stimuli encouraging confident or borderline reckless behavior).

Still referring to FIG. 1, in one or more embodiments, aspects of the present disclosure are directed to apparatus 100 for generating an instruction set for a user. Described processes are executed by computing device 104 including processor 144, which is configured to execute any one or more of the described steps. Memory component 140 is connected to processor 144 and contains instructions configuring processor to receive client datum 108 from a client. For example, in one or more embodiments, the client datum may include one or more elements, datum and/or data describing client information, payment, and/or the like. Accordingly, the client datum may describe various resources (e.g., monetary, land, intellectual property, and other forms of intangible assets and the like) of the client and a pattern that is representative of client interaction with the user.

In addition, memory component 140 contains instructions configuring the at least processor 144 to receive a user datum from the user. More particularly, the user datum may include one or more elements, datum and/or data describing goal data, where goal data relates to an amount of payment that the user wants to get from the client (e.g., for services the user rendered to the client, etc.). In addition, user datum 112 may describe user information, work habits, skill, client relationships, and the like. Further, in some embodiments, the user datum includes target datum 116 that at least generally describes resource transfer data from the client to the user. For example, such resource transfer data may include descriptions of repeat monetary payments from the client to the user over a specified duration relating to compensation for services rendered.

Specific payment scenarios may include monthly payments from a business (e.g., the client) to its law firm (e.g., the user) relating to transactional, government, or litigation related law practice work handled by the law firm on behalf of the business. In addition, or the alternative, other examples may relate to personal performance training improvements, where an aspiring athlete (e.g., the client) hires a personal trainer (e.g., the user) to systematically focus on nutrition, hydration, sleep, progressive resistance, and cardiovascular training on a bi-weekly basis for six to eight months. The personal trainer may receive routine payments from the aspiring athlete, where such payments are described by resource transfer data. In addition, the target datum may describe an optimal or a maximum payment desired by the user from the client. That is, in the context of personal training, bi-weekly sessions can cost $130 per hour, for a total of $1,040 per month when purchased individually. However, the user (e.g., the gym providing personal training services) can elect to discount such services when bought as a monthly recurring package, setting a package price of $850 per month for a minimum of 6 months. Accordingly, in one or more embodiments, this monthly recurring discounted price can be represented by the target datum.

In some embodiments, initiation of resource transfer described by target datum 118 is triggered by the pattern representative of client interaction with the user exceeding threshold datum 122. That is, in the context of personal training, the threshold may be after two initial complimentary sessions. Accordingly, billing from the gym to the aspiring athlete will initiate upon start of the third session between the aspiring athlete and the personal training. The third session, in this context, is the threshold triggering initiation of resource transfer from the client (e.g., the aspiring athlete) to the user (e.g., the gym).

In addition, or the alternative, classifier 124 of machine-learning module 120 may determine a user score based on user datum 112 relating to one or more categories. In some instances, the user score may include work habit score, skill score, client relationship score, and the like. More particularly, classifier 124 may classify resource transfer data and/or user datum 112 to client datum 108 and generate the user score based on proximity or similarity of resource transfer data to client datum 108. That is, if the client is routinely paying their bills and meeting or exceeding user expectations, the user scope may be commensurate with such favorable repayment behavior and be high, or vice-versa.

Further, in one or more embodiments, client datum 108 and user datum 112 may be classified by machine-learning module 120 of computing device 104 into one or more categories (also alternatively referred to herein as "goal groups.") More particularly, client datum 108 and user datum 112 may be classified to, for example, one or more instances of transfer datum 116, target datum 118 and/or threshold datum 122 using classifier. The one or more goal groups may include, for example and without limitation, a client category, a user category, and the like. In some instance, the client category may include multiple sub-categories, such as a client information category, payment category, and the like. In addition, the user group may include a user information category, goal category, work habit category, skill category, client relationship category, and the like.

In addition, or the alternative, memory component 140 contains instructions configuring processor 144 to classify client datum 108 and user datum 112 to multiple categories (e.g., as shown by transfer object database 300 of FIG. 3), calculate target datum 118 based on classification of client datum 108 and user datum 112 to at least one of multiple categories, and identify one or more instances of transfer datum 116, including a first transfer datum and at least a second transfer datum from resource transfer data. That is, the first transfer datum can represent a first monthly payment (e.g., $850 for April for monthly personal training services), and the second transfer datum can represent a second monthly payment (e.g., $850 for May for monthly personal training services).

Refining at least the first transfer datum includes classifying at least the first transfer datum to target datum 118 and ranking (e.g., hierarchically) the first transfer datum and the second transfer datum relative to target datum 118, such as whether the client paid less that the requested $850/mo. or skipped one or more payments entirely. Accordingly, in one or more embodiments, described processes can also determine the threshold as a function of the user score and ranked aggregated or total payments. In some embodiments, threshold datum 122 may be a minimum payment (e.g., $50/mo.) the user (e.g., gym) must receive from the client (aspiring athlete) and the threshold may be determined by classifying payment history as demonstrated by classifying resource transfer data to user datum. More particularly, in one or more embodiments, the threshold may be one or more of: (1) a smallest number of the ranked total payments; (2) an average of the total payments; and/or (3) determined as a function of the user score by using the classifier to classify user datum 112 to one or more described data elements, such as client datum 108. More particularly, in one or more embodiments, threshold datum 122 may describe the user's skill, work habit, client relationship, and the like.

In addition, the memory contains instructions configuring the at least a processor to generate an interface query data structure (e.g., displayed by GUI 136 of display device 132) including input field 148 based on ranking the first transfer datum and the second transfer datum. More particularly, the interface query data structure configures display device 132 to display input field 148 to the user and receive at least a user-input datum (e.g., user-input datum 224A) into the input field. In some embodiments, user-input datum 224A describes data for selecting a preferred attribute of transfer data (e.g., one or more instances of transfer datum 116) associated with one or more instances of rankings of the first transfer datum and the second transfer datum. Still further, the interface query data structure configures display device 132 to display the instruction set including displaying the first transfer datum and at least the second transfer datum hierarchically based on the user-input datum.

In addition, in one or more embodiments, generating the interface query data structure further includes retrieving data describing attributes of the user from a database communicatively connected to the processor and generating the interface query data structure based on the data describing attributes of the user. Further, in addition, or the alternative, generating the target datum further includes retrieving data describing current preferences of the client (e.g., regarding resource transfer data from the client to the user for services rendered, etc.) between a minimum value and a maximum value from a database communicatively connected to the processor, and generating the interface query data structure based on the data describing current preferences of the client.

As described earlier, generating the instruction set further includes classifying at least the first transfer datum and the second transfer datum to the target datum, ranking the first transfer datum and the second transfer datum to the target datum, and adjusting the threshold for triggering resource transfer from the client to the user based on the user-input datum. In addition, or the alternative, in one or more embodiments, generating the instruction set further includes determining the threshold by classifying the pattern that is representative of client interaction with the user to the user datum.

In some embodiments, generating the instruction set further includes adjusting the pattern that is representative of client interaction with the user based on threshold datum 122. In addition, in some instances, generating the instruction set further includes classifying client datum 108 to one or more categories based on the pattern that is representative of client interaction with the user.

In one or more embodiments, apparatus 100 is further configured to evaluate user-input datum 224A including classifying, by classifier 124 one or more new instances of user-input datum 224A with the first transfer datum and the second transfer datum generating a consecutive transfer datum based on the classification, and displaying the first transfer datum, the second transfer datum, and at least the consecutive transfer datum hierarchically based on the classification of the consecutive transfer datum to one or more new instances of the user-input datum.

In addition, or the alternative, classifying client datum 108 and user datum 112 to multiple categories further includes aggregating the first transfer datum and at least the second transfer datum based on the classification and further classifying aggregated transfer data to data describing the pattern that is representative of client interaction with the user. Also, in some instances, the interface query data structure further configures display device 132 to provide an articulated graphical display including multiple regions organized in a tree structure format, wherein each region provides one or more instances of point of interaction between the user and the remote display device.

Still further, described processes executed by machine-learning module 120 of computing device 104 may generate an output (e.g., the described instruction set and/or transfer data hierarchy 224B) inclusive of a text and/or digital media-based content describing a strategy recommendation as a function of, for example, target datum 118, client datum 108, and the user score, where the strategy recommendation may also be generated using a machine learning model as to be further described below. In some instances, the strategy recommendation may be configured to increase the threshold or increase the payment from the client. In addition, or the alternative, the strategy recommendation may include a skill recommendation to improve a skill of a user (e.g., such as providing Pilates as a part of personal-training services), such as an organizational skill recommendation, technical skill recommendation, and the like. Still further, in some instances, the strategy recommendation may include a client relationship recommendation, such as to improve a relationship between the client and the user. For example, the client relationship recommendation may include communication recommendation, networking recommendation, and the like.

In one or more particular embodiments, the strategy recommendation may include a work habit recommendation to improve work habit of the user, such as a working time recommendation, efficiency recommendation, and the like. In addition, or the alternative, the strategy recommendation may include a support recommendation to improve a support structure of the user, such as a team recommendation, system recommendation, and the like.

Still further, in one or more embodiments, client datum 108 may be classified by classifier 124 into one or more client character groups using a client characteristic classification model. For example, as a non-limiting example, the client character groups may be described by data relating to, for example, various traits such as being shy, extroverted, openness, conscientiousness, agreeableness, neuroticism, resilience, optimism, assertiveness, ambition, introverted, and the like. In addition, or the alternative, the described instruction set may be generated to include data describing, for example, a persuasion recommendation as a function of the one or more client character groups. More particularly, the persuasion recommendation may a recommendation for the user to improve persuasion skills to communicate the clients.

In some instances, in one or more embodiments, computing device 104 is configured to receive at least an element of target datum 118. In addition, or the alternative, computing device 104 is configured to receive one or more instances of an "outlier cluster," as used for methods described in U.S. patent application Ser. No. 18/141,320, filed on Apr. 28, 2023, titled "METHOD AND AN APPARATUS FOR ROUTINE IMPROVEMENT FOR AN ENTITY," and, U.S. patent application Ser. No. 18/141,296, filed on Apr. 28, 2023, titled "SYSTEMS AND METHODS FOR DATA STRUCTURE GENERATION," both of which are incorporated herein by reference herein in their respective entireties. As described earlier and throughout this disclosure, a "target datum" is an element, datum, or elements of data describing a payment or repayment goal or objective, either short or long term, desired for achievement by the user. Accordingly, in this example, target datum 118 may be determined or identified using one or more outlier clusters. More particularly, described machine-learning processes may use, as inputs, one or more instances of client datum 108, user datum 112, transfer datum 116, target datum 118 and/or threshold datum 122 in combination with the other data described herein, and use one or more associated outlier cluster elements with target outputs, such as transfer data hierarchy 224B. As a result, in some instances, classifier 124 may classify inputs to target outputs including associated outlier cluster elements to generate transfer data hierarchy 224B.

In addition, and without limitation, in some cases, database 150 may be local to computing device 104. In another example, and without limitation, database 150 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 150. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Database 150 may include keywords. As used in this disclosure, a "keyword" is an element of word or syntax used to identify and/or match elements to each other. For example, without limitation, a keyword may be "finance" in the instance that a business is seeking to optimize operations in the financial services and/or retirement industry. In another non-limiting example, keywords of a key-phrase may be "luxury vehicle manufacturing" in an example where the business is seeking to optimize market share internationally, or certain rapidly developing markets. Database 150 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1, a "classifier," as used in this disclosure is type or operational sub-unit of any described machine-learning model or process executed by machine-learning module 120, such as a mathematical model, neural net, or program generated by a machine-learning algorithm known as a "classification algorithm" that distributes inputs into categories or bins of data, outputting the categories or bins of data and/or labels associated therewith. A classifier may be configured to classify and/or output at least a datum (e.g., one or more instances of any one or more of client datum 108, user datum 112, transfer datum 116, and/or target datum 118 as well as other elements of data produced, stored, categorized, aggregated or otherwise manipulated by the described processes) that labels or otherwise identifies a set of data that are clustered together, found to be close under a distance metric, or the like.

Referring again to FIG. 1, computing device 104 may be configured to identifying business impact by using classifier 124 to classify one or more instances of any one or more of client datum 108, user datum 112, transfer datum 116, and/or target datum 118 based on user attributes 154 and/or category data 158. Accordingly, classifier 124 of machine-learning module 120 may classify attributes within user attributes 154 related to demonstrating one or more repayment behaviors toward reaching or exceeding target datum 118.

In addition, in some embodiments, machine-learning module 120 performing the described correlations may be supervised. Alternatively, in other embodiments, machine-learning module 120 performing the described correlations may be unsupervised. In addition, classifier 124 may label various data (e.g., one or more instances of any one or more of client datum 108, user datum 112, transfer datum 116, and/or target datum 118 as well as other elements of data produced, stored, categorized, aggregated, or otherwise manipulated by the described processes) using machine-learning module 120. For example, machine-learning module 120 may label certain relevant parameters of one or more instances of client datum 108 with parameters of one or more user attributes 154.

In addition, machine-learning processes performed by machine-learning module 120 may be trained using one or more instances of category data 158 to, for example, more heavily weigh or consider instances of category data 158 deemed to be more relevant to the business. More specifically, in one or more embodiments, category data 158 may be based on or include correlations of parameters associated with client datum 108 to parameters of user attributes 154. In addition, category data 158 may be at least partially based on earlier iterations of machine-learning processes executed by machine-learning module 120. In some instances, running machine-learning module 120 over multiple iterations refines correlation of parameters or data describing entity operations (e.g., associated with client datum 108) with parameters describing at least user attributes 154.

Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $1=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Figure 2:
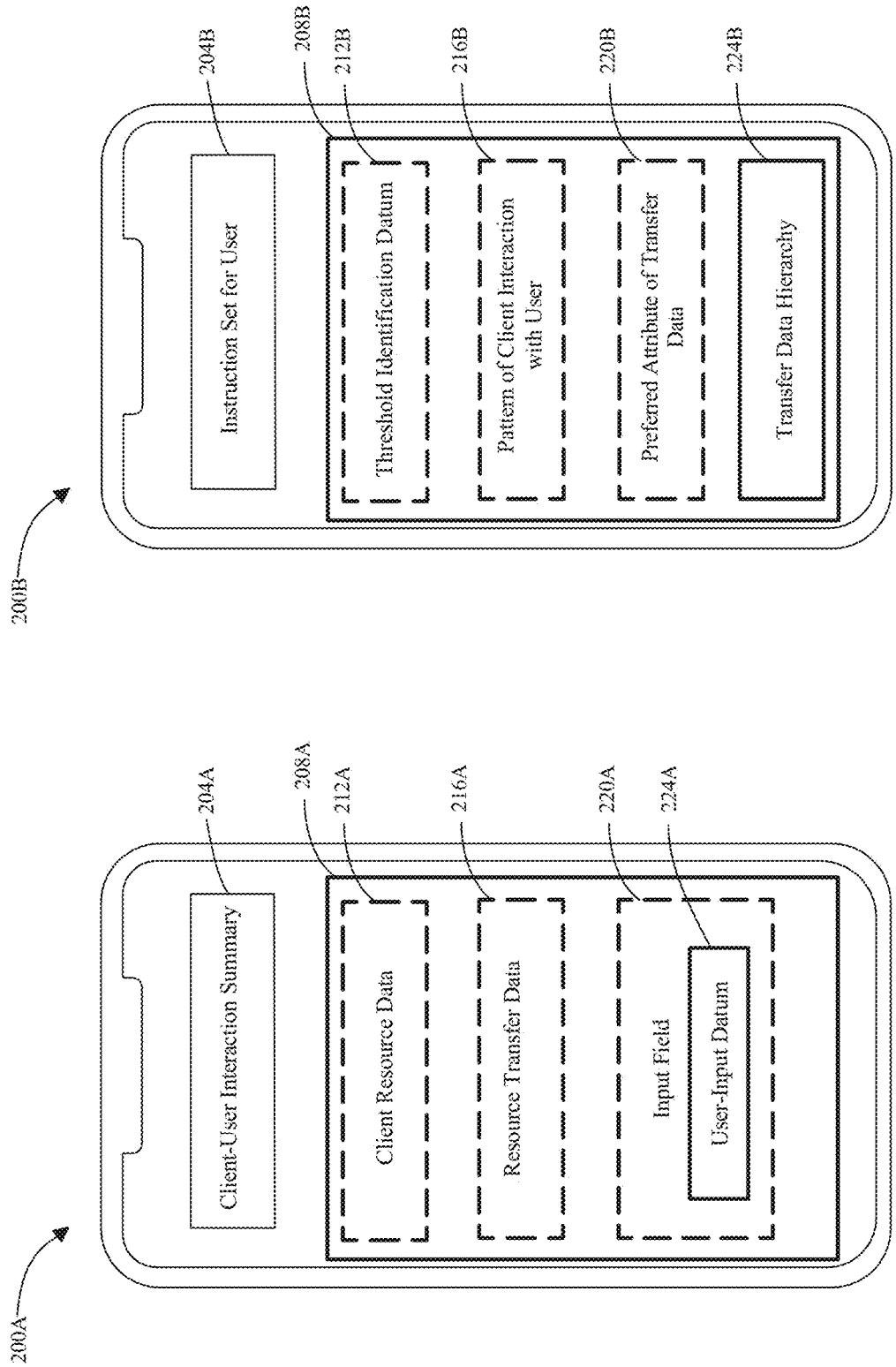
FIGS. 2A-2B are diagrammatic representations of multiple exemplary embodiments of output generated by an interface query data structure.

Referring now to FIGS. 2A-2B, exemplary embodiments of user input field 148 as configured to be displayed by GUI 136 of display device 132 based on an interface query data structure are illustrated. As defined earlier, an "interface query data structure" refers to, for example, a data organization format used to digitally request a data result or action on the data (e.g., stored in a database). In one or more embodiments, each output screen 200A-200B may be an example of an output screen configured to be displayed by display device 132 of FIG. 1 by the described interface query data structure. That is, more particularly, the described interface query data structure may configure display device 132 of FIG. 1 to display any one or more of output screens 200A-200B as described in the present disclosure. Accordingly, output screen 200A may include multiple forms of indicia.

In one or more embodiments, output screen 200A and output screen 200B may be examples of user input field 148 and/or GUI 136 as displayed by display device 132, which may be a "smart" phone, such as an iPhone, or other electronic peripheral or interactive cell phone, tablet, etc. Output screen 200A may be a screen initially displayed to a user (e.g., a human or a human representing or acting on behalf of a business or some other entity, and have user engagement area 208 including identification field 204A, client resource data field 212A, resource transfer field 216A, user-input field 220A, which may include one or more instances of user-input datum 224A describing data for selecting a preferred attribute of any one or more repayment behaviors associated with one or more instances of client datum 108.

In addition, in one or more embodiments, user-input datum 224A may be reflective of and/or provide a basis for user attributes 154. Persons skilled in the art, upon reviewing the entirety of this disclosure, will be aware of various ways in which fewer or additional interactive user input fields may be displayed by screen 208A. Identification field 204A may identify described processes performed by processor 144 of computing device 104 by displaying identifying indicia, such as "Client-User Interaction Summary" as shown in FIG. 2A to permit, for example, a human to interact with GUI 136 and input information relating to a field of choice (e.g., business operations), through (for example) interactivity provided by identification field 204A.

Such information can include data describing activities performed by the business relating to the business achieving its defined goal (e.g., target datum 118 of FIG. 1). In some instances, a human may select from one or more options (not shown in FIG. 2A) relating to prompts provided by identification field 204A to input such information relating to specific details of, for example, the business. In addition, in some embodiments, any of the described fields may include interactive features, such as prompts, permitting for a human to select additional textual and/or other digital media options further identifying or clarifying the nature of the business relating to the respective specifics of that field. For example, client resource data field 212A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine-learning module 120 and thereby correspondingly appear in the described progression sequence.

Like output screen 200A, output screen 200B may be an example of a screen subsequently shown to a human as described earlier based on human-provided input to any one or more of the displayed fields. That is, output screen 200B may display "Instruction Set for User" in identification field 204B as indicating completion of intake of human-provided input and that described machine-learning processes have completed described classifying processes to output customized skill factor assessment area 208B to the user. For example, in one or more embodiments, customized repayment assessment area 208B may also include multiple human-interactive fields, including threshold identification field 212B, client interaction field 216B, preferred attribute field 220B, and transfer data hierarchy 224B generated as described earlier.

Persons skilled in the art, upon reviewing the entirety of this disclosure, will be aware of various ways in which fewer or additional interactive human input fields may be displayed by output screen 200B. Each field within customized repayment assessment area 208B may display any combination of human interactive text and/or digital media, each field intending to provide specific data-driven feedback directed to optimizing ongoing business performance of the business. Various example types of specifics (e.g., "decrease risky leverage in high interest rate conditions") are shown in customized skill factor assessment area 208B, but persons skilled in the art will be aware of other example types of feedback, each of which being generated as suitable for a given business by processor 144. In addition, in one or more embodiments, any one or more fields of customized skill factor assessment area 208B may be human-interactive, such as by posing a query for the human to provide feedback in the form of input such that described machine-learning processes performed by machine-learning module 120 may intake refined input data and correspondingly process related data and provide an updated customized repayment assessment area 208B. In some embodiments, such processes may be performed iteratively, thereby allowing for ongoing refinement, redirection, and optimization of customized repayment assessment area 208B to better meet the needs of the client or user.

Figure 3:
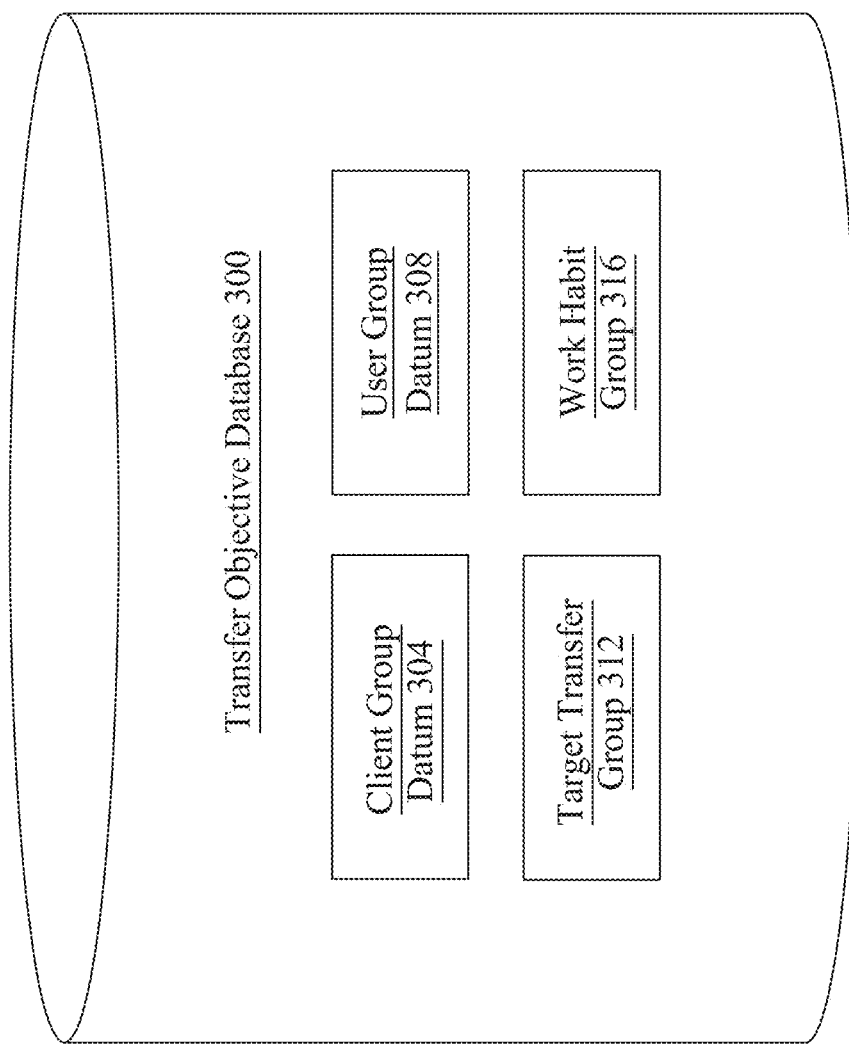
FIG. 3 is a diagrammatic representation of a transfer objective database.

Referring now to FIG. 3, an exemplary embodiment of transfer objective database 300 is illustrated. In one or more embodiments, transfer objective database 300 may be an example of database 150 of FIG. 1. Query database may, as a non-limiting example, organize data stored in the user activity database according to one or more database tables. One or more database tables may be linked to one another by, for instance, common column values. For instance, a common column between two tables of expert database may include an identifier of a query submission, such as a form entry, textual submission, or the like, for instance as defined below; as a result, a query may be able to retrieve all rows from any table pertaining to a given submission or set thereof. Other columns may include any other category usable for organization or subdivision of expert data, including types of query data, identifiers of interface query data structures relating to obtaining information from the user, times of submission, or the like. Persons skilled in the art, upon reviewing the entirety of this disclosure, will be aware of various ways in which user activity data from one or more tables may be linked and/or related to user activity data in one or more other tables.

In addition, in one or more embodiments, computing device 104 may be configured to access and retrieve one or more specific types of user attributes 154 and/or other data types, e.g., one or more instance of client datum 108, user datum 112, transfer datum 116 and/or target datum 118, as well as threshold datum 122, categorized in multiple tables from transfer objective database 300. For example, as shown in FIG. 3, transfer objective database 300 may be generated with multiple categories including client group datum 304, user group datum 308, target transfer group 312 and work habit 316. Consequently, described processes may classify one or more instances of client datum 108 from client group datum 304 to user datum 112 and/or user-input datum 224A that may be input user input field 148 of FIG. 1. In some instances, user-input datum 224A may describe data for selecting a preferred attribute of any one or more skills associated with one or more instances of transfer datum 116. In addition, described processes may retrieve data describing additional attributes related to the preferred attribute of transfer datum 116 from transfer objective database 300 connected with the processor based on client group datum 304 (e.g., or, alternatively, one or more of user group datum 308, target transfer group 312, and/or work habit 316, etc.).

Figure 4:
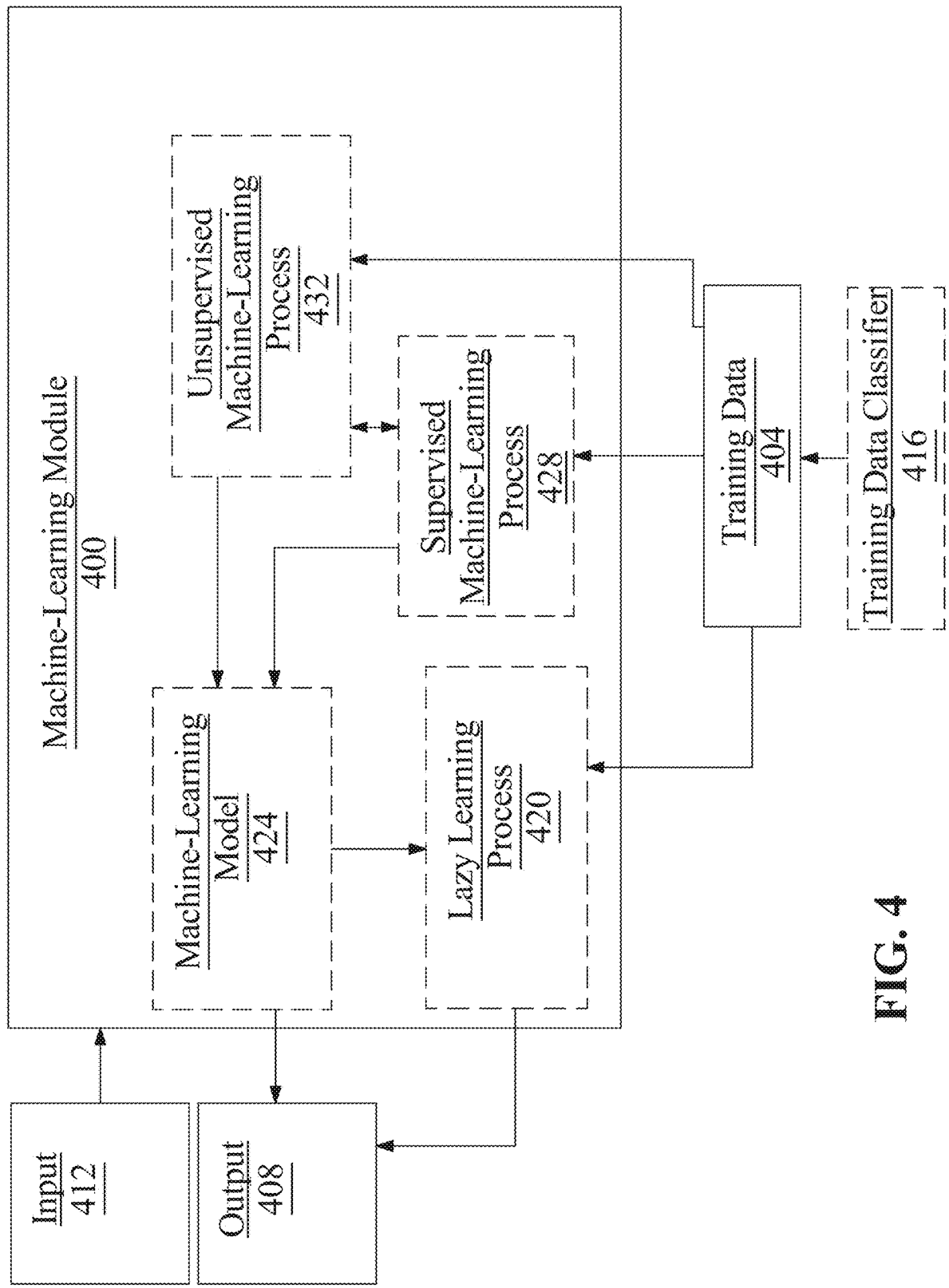
FIG. 4 is a block diagram of exemplary machine-learning processes.

Referring now to FIG. 4, an exemplary embodiment of a machine-learning module 400 that may perform one or more machine-learning processes as described in this disclosure is illustrated. In one or more embodiments, machine-learning module 400 may be an example of machine-learning module 120 of computing device 104 of FIG. 1. Machine-learning module 120 may perform determinations, classification, and/or analysis steps, methods, processes, or the like as described in this disclosure using machine-learning processes. A "machine-learning process," as used in this disclosure, is a process that automatedly uses training data 404 to generate an algorithm that will be performed by a computing device/module (e.g., computing device 104 of FIG. 1) to produce outputs 408 given data provided as inputs 412; this is in contrast to a non-machine-learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include multiple data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

As a non-limiting illustrative example, input data may include one or more instances of any one or more of client datum 108, user datum 112, transfer datum 116, and/or target datum 118, as well as category data 158 and/or user attributes 154, to provide the instruction set as may be determined as described earlier, such as where at least some instances of the transfer datum 116 exceeding a threshold (e.g., that may be user-defined and input into user input field 148, or externally defined) are aggregated to define and display the instruction set to the user. In addition, in one or more embodiments, the interface query data structure as described herein includes one or more interface query data structures, any one of which may include an interface that defines a set of operations supported by a data structure and related semantics, or meaning, of those operations. For example, in the context of personal performance improvement coaching, interface query data structure may include one or more interface query data structures that may appear to the user in the form of one or more text-based or other digital media-based surveys, questionnaires, lists of questions, examinations, descriptions, etc.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to iteratively refine the instruction set to reflect the user's preferences, such as by preparing transfer data hierarchy 224B for the user to more effectively and/or efficiently progress to match target datum 118.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic May include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes for providing a skill factor (e.g., of transfer datum 116) hierarchy to a user. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include one or more instances of any one or more of client datum 108, user datum 112, transfer datum 116, and/or target datum 118, as well as category data 158 and/or user attributes 154 as described above as inputs, transfer data hierarchy 224B and/or similar textual and/or visual imagery (e.g., digital photos and/or videos) relating to providing transfer data hierarchy 224B to a user as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine-learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
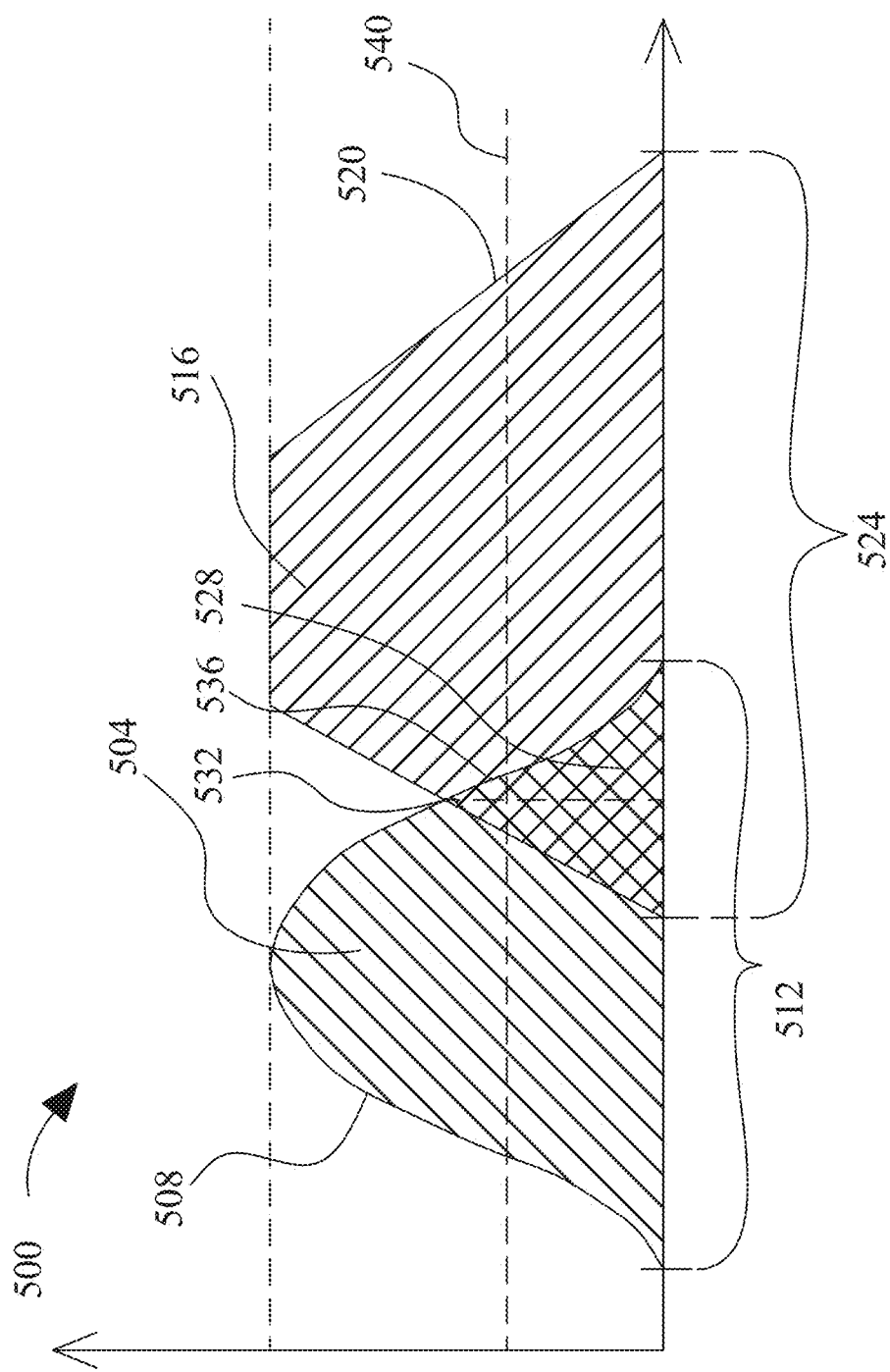
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a skill factor hierarchy to a user as performed by processor 144 of computing device 104 may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, one or more instances of any one or more of client datum 108, user datum 112, transfer datum 116, and/or target datum 118, as well as category data 158 and/or user attributes 154, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \dfrac{x-a}{b-a}, & \text{for } a \leq x < b \\ \dfrac{c-x}{c-b}, & \text{if } b < x \leq c \end{cases}$$

a trapezoidal membership function may be defined as:

$$y(x, a, b, c, d) = \max\left(\min\left(\dfrac{x-a}{b-a}, 1, \dfrac{d-x}{d-c}\right), 0\right)$$

a sigmoidal function may be defined as:

$$y(x, a, c) = \dfrac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\dfrac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, one or more instances of any one or more of client datum 108, user datum 112, transfer datum 116, and/or target datum 118, as well as category data 158 and/or user attributes 154, and a predetermined class, such as without limitation, query data or information including interface query data structures stored in transfer objective database 300 of FIG. 3. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models one or more instances of any one or more of client datum 108, user datum 112, transfer datum 116, and/or target datum 118, as well as category data 158 and/or user attributes 154 and a predetermined class, such as without limitation, query data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify one or more instances of any one or more of client datum 108, user datum 112, transfer datum 116, and/or target datum 118, to as well as category data 158 and/or user attributes 154 stored in transfer objective database 300. For instance, if client datum 108 and/or interface query data structure 112 has a fuzzy set matching certain interface query data structure data values stored in transfer objective database 300 (e.g., by having a degree of overlap exceeding a threshold), computing device 104 may classify one or more instances of any one or more of client datum 108, user datum 112, transfer datum 116, and/or target datum 118 as belonging to user attributes 154 (e.g., aspects of user behavior as demonstrated by user attributes 154 of FIG. 1 and/or user group datum 308 of FIG. 3 relating to user commitment towards achieving target datum 118). Where multiple fuzzy matches are performed, degrees of match for each respective fuzzy set may be computed and aggregated through, for instance, addition, averaging, or the like, to determine an overall degree of match.

Still referring to FIG. 5, in an embodiment, client datum 108 and/or user datum 112 may be compared to multiple transfer objective database 300 categorization fuzzy sets. For instance, client datum 108 and/or user datum 112 may be represented by a fuzzy set that is compared to each of the multiple transfer objective database 300 categorization fuzzy sets; and a degree of overlap exceeding a threshold between the client datum 108 and/or user datum 112 fuzzy set and any of the transfer objective database 300 categorization fuzzy sets may cause computing device 104 to classify one or more instances of any one or more of client datum 108, user datum 112, transfer datum 116, and/or target datum 118 as belonging to one or more corresponding interface query data structures associated with transfer objective database 300 categorization (e.g., selection from categories in transfer objective database 300, etc.). For instance, in one embodiment there may be two transfer objective database 300 categorization fuzzy sets, representing, respectively, transfer objective database 300 categorization (e.g., into each of client group datum 304, user group datum 308, target transfer group 312, and/or work habit 316). For example, a First transfer objective database 300 categorization may have a first fuzzy set; a Second transfer objective database 300 categorization may have a second fuzzy set; and one or more instances of any one or more of client datum 108, user datum 112, transfer datum 116, and/or target datum 118, to as well as category data 158 and/or user attributes 154 may each have a corresponding fuzzy set.

Computing device 104, for example, may compare one or more instances of any one or more of client datum 108, user datum 112, transfer datum 116, and/or target datum 118, to as well as category data 158 and/or user attributes 154 fuzzy sets with fuzzy set data describing each of the categories included in transfer objective database 300, as described above, and classify one or more instances of any one or more of client datum 108, user datum 112, transfer datum 116, and/or target datum 118, to as well as category data 158 and/or user attributes 154 to one or more categories (e.g., client group datum 304, user group datum 308, target transfer group 312, and/or work habit 316). Machine-learning methods as described throughout may, in a non-limiting example, generate coefficients used in fuzzy set equations as described above, such as without limitation x, c, and σ of a Gaussian set as described above, as outputs of machine-learning methods. Likewise, any described datum herein may be used indirectly to determine a fuzzy set, as, for example, client datum 108 fuzzy set and/or user datum 112 fuzzy set may be derived from outputs of one or more machine-learning models that take client datum 108 and/or user datum 112 directly or indirectly as inputs.

Still referring to FIG. 5, a computing device may use a logic comparison program, such as, but not limited to, a fuzzy logic model to determine a transfer objective database 300 response. A transfer objective database 300 response may include, but is not limited to, accessing and/or otherwise communicating with any one or more of client group datum 304, user group datum 308, target transfer group 312, work habit 316, and the like; each such transfer objective database 300 response may be represented as a value for a linguistic variable representing transfer objective database 300 response or in other words a fuzzy set as described above that corresponds to a degree of matching between data describing client datum 108 and/or user datum 112 and one or more categories within transfer objective database 300 as calculated using any statistical, machine-learning, or other method that may occur to a person skilled in the art upon reviewing the entirety of this disclosure.

In some embodiments, determining a transfer objective database 300 categorization may include using a linear regression model. A linear regression model may include a machine-learning model. A linear regression model may be configured to map data of client datum 108 and/or user datum 112, to one or more transfer objective database 300 parameters. A linear regression model may be trained using a machine-learning process. A linear regression model may map statistics such as, but not limited to, quality of client datum 108 and/or user datum 112. In some embodiments, determining transfer objective database 300 of client datum 108 and/or user datum 112 may include using a transfer objective database 300 classification model. A transfer objective database 300 classification model may be configured to input collected data and cluster data to a centroid based on, but not limited to, frequency of appearance, linguistic indicators of quality, and the like. Centroids may include scores assigned to them such that quality of client datum 108 and/or user datum 112 may each be assigned a score.

In some embodiments, transfer objective database 300 classification model may include a K-means clustering model. In some embodiments, transfer objective database 300 classification model may include a particle swarm optimization model. In some embodiments, determining the transfer objective database 300 of client datum 108 and/or user datum 112 may include using a fuzzy inference engine (e.g., to assess the progress of the user and use said data to amend or generate new strategies based on user progress). A fuzzy inference engine may be configured to map one or more instances of any one or more of client datum 108, user datum 112, transfer datum 116, and/or target datum 118, to as well as category data 158 and/or user attributes 154 data elements using fuzzy logic. In some embodiments, described datum may be arranged by a logic comparison program into transfer objective database 300 arrangement. A "transfer objective database 300 arrangement" as used in this disclosure is any grouping of objects and/or data based on similarity to each other and/or relation to providing transfer data hierarchy 224B of FIG. 2B to the user for the user to achieve. This step may be implemented as described above in FIG. 1.

Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to client datum 108 and/or user datum 112, such as a degree of matching between data describing user aspirations and strategies based on responses to interface query data structures stored in transfer objective database 300. Continuing the example, an output linguistic variable may represent, without limitation, a score value. An inference engine may combine rules, such as: "if the demonstrated commitment level of a person or business falls beneath a threshold," and "the observed performance of the person or business relative to their or its peers is deficient," the commitment score is 'deficient'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤1(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
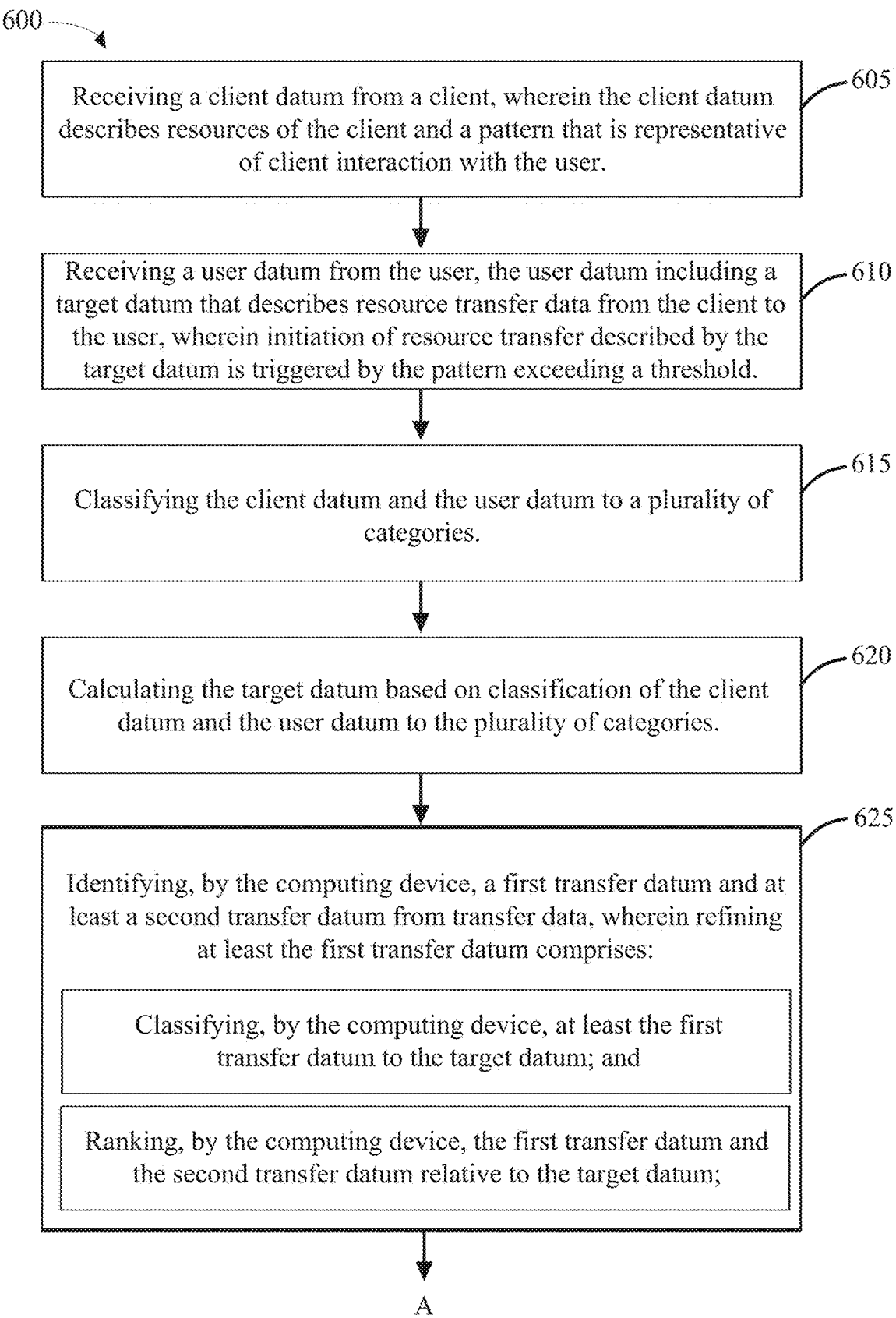
FIG. 6 is a flow diagram of an exemplary method for generating an instruction set for a user.
Figure 6:
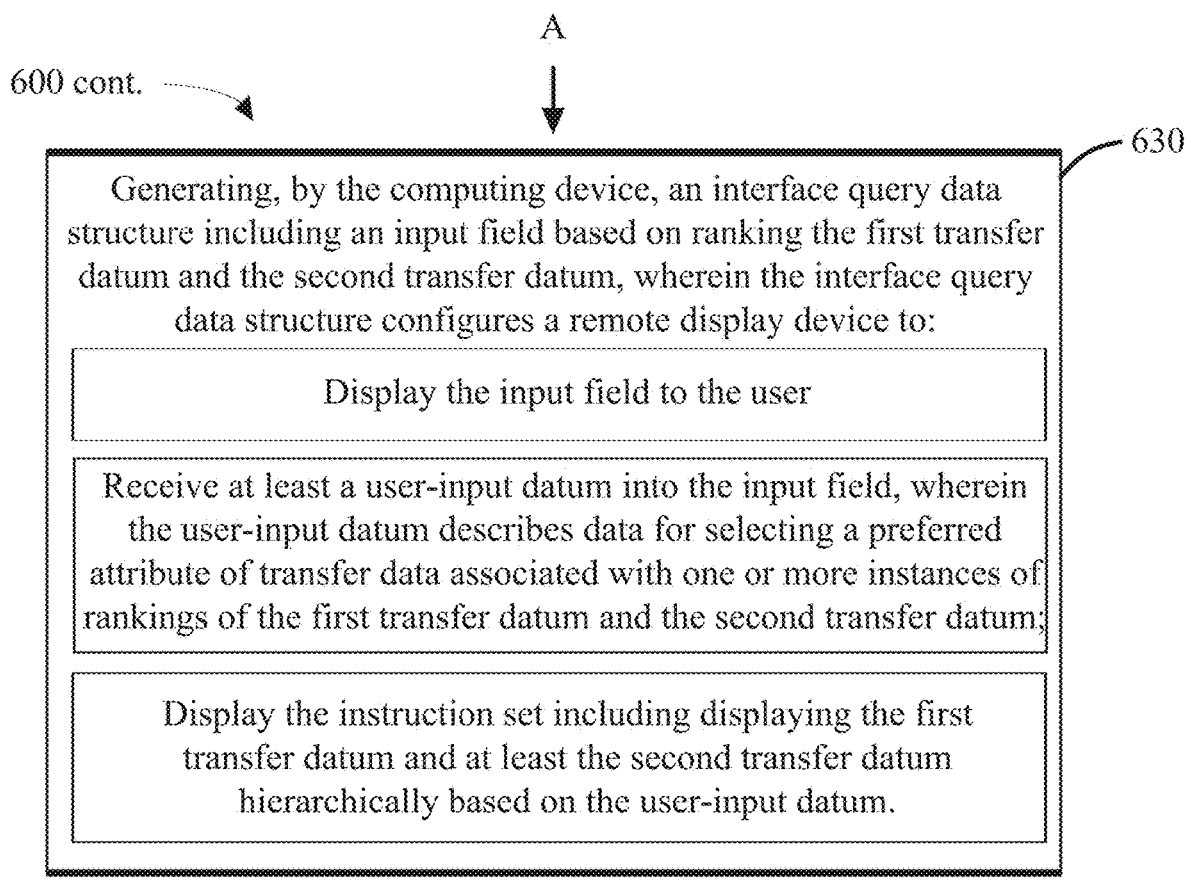

Now referring to FIG. 6, method 600 for generating an instruction set for a user is described. At step 605, method 600 includes receiving, by a computing device, a client datum from a client, wherein the client datum describes resources of the client and a pattern that is representative of client interaction with the user. This step may be implemented as described above, without limitation, in FIGS. 1-7.

Still referring to FIG. 6, at step 610, method 600 includes receiving, by the computing device, a user datum from the user, the user datum including a target datum that describes resource transfer data from the client to the user, wherein initiation of resource transfer described by the target datum is triggered by the pattern exceeding a threshold. This step may be implemented as described above, without limitation, in FIGS. 1-7.

Still referring to FIG. 6, at step 615, method 600 includes classifying, by the computing device, the client datum, and the user datum to a plurality of categories. This step may be implemented as described above, without limitation, in FIGS. 1-7.

Still referring to FIG. 6, at step 620, method 600 includes calculating, by the computing device, the target datum based on classification of the client datum and the user datum to the plurality of categories. The interface query data structure configures display device 132 to display the input field to the user. This step may be implemented as described above, without limitation, in FIGS. 1-7.

Still referring to FIG. 6, at step 625, method 600 includes identifying, by the computing device, a first transfer datum and at least a second transfer datum from transfer data, wherein refining at least the first transfer datum comprises classifying, by the computing device, at least the first transfer datum to the target datum; and ranking, by the computing device, the first transfer datum and the second transfer datum relative to the target datum.

Still referring to FIG. 6, at step 630, method 600 includes generating, by the computing device, an interface query data structure including an input field based on ranking the first transfer datum and the second transfer datum, wherein the interface query data structure configures a remote display device to display the input field to the user; receive at least a user-input datum into the input field, wherein the user-input datum describes data for selecting a preferred attribute of transfer data associated with one or more instances of rankings of the first transfer datum and the second transfer datum; and display the instruction set including displaying the first transfer datum and at least the second transfer datum hierarchically based on the user-input datum.

In addition, the interface query data structure configures display device 132 to receive at least user-input datum 224A into user input field 148. User-input datum 224A describes data for selecting a preferred attribute of any one or more skills associated with one or more instances of the aggregated first skill factor datum and at least the second skill factor datum. In addition, the interface query data structure configures display device 132 to display the first skill factor and at least the second skill factor datum hierarchically based on user-input datum 224A.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
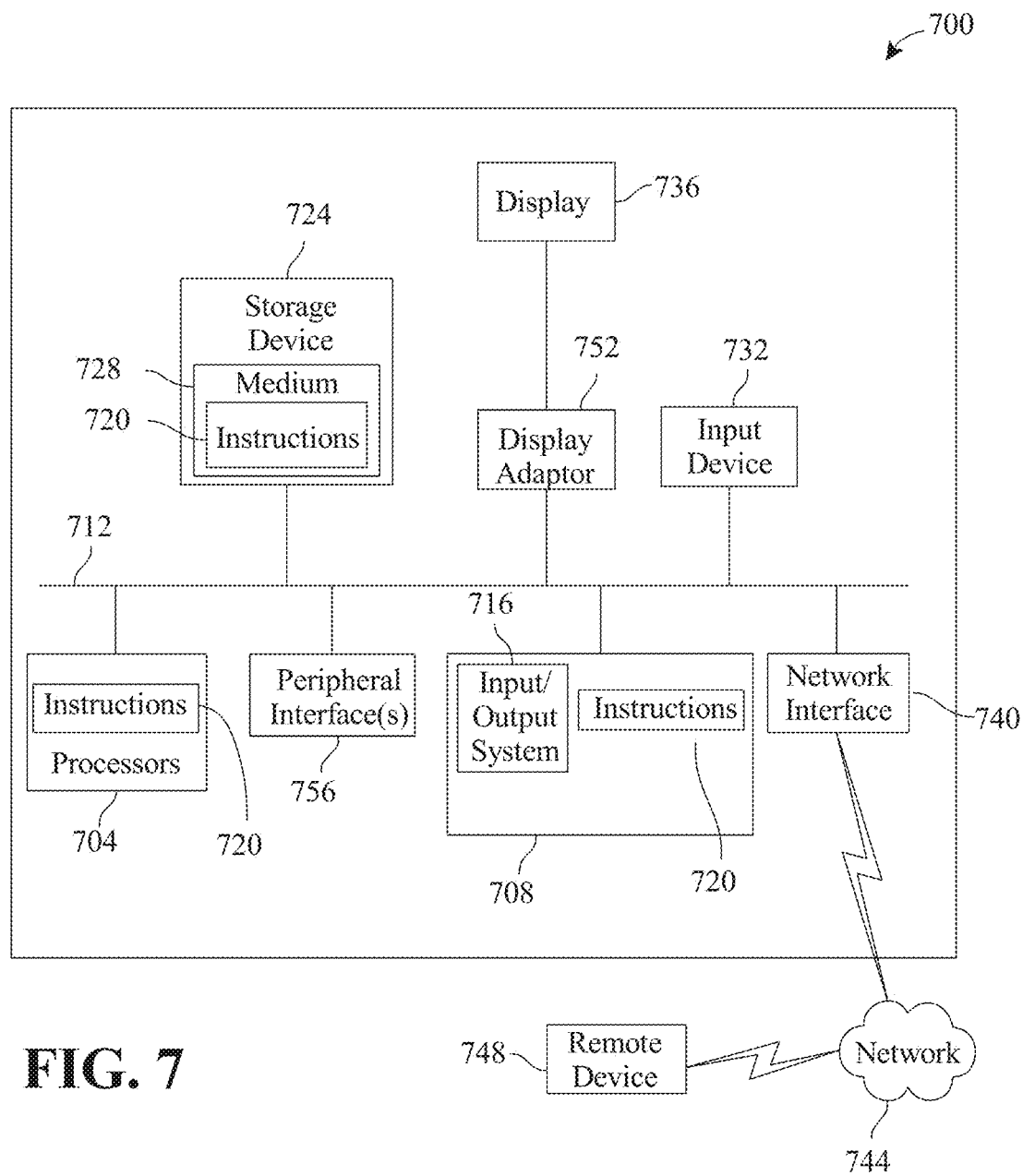
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Video display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for generating an instruction set for a user, the apparatus comprising: at least a processor;
    a memory connected to the processor, the memory containing instructions configuring the at least a processor to:
    receive a client datum from a client device, wherein the client datum describes at least a resource of the client device; receive a user datum from the user;
    classify the client datum and the user datum to a category of a plurality of categories; calculate a target datum wherein the target datum identifies an optimum confidence level;
    generate a transfer datum as a function of the optimum confidence level;
    wherein generating the transfer datum further comprises generating an interface query data structure including an input field based on ranking the first transfer datum and the at least a second transfer datum;
    receive at least a user-input datum into an input field, wherein the user-input datum describes data for selecting a preferred attribute of resource transfer data associated the transfer datum; and
    display an instruction set including displaying the transfer datum based on the user-input datum wherein the instruction set is further configured to: generate a strategy recommendation as a function of at least the target datum wherein the strategy recommendation identifies a client relationship recommendation.

2. The apparatus of claim 1, wherein classifying the client datum further comprises a client characteristic classification model wherein the client characteristic classification model classifies the client datum into at least a client character group.

3. The apparatus of claim 1, wherein generating the transfer datum further comprises identifying a first transfer datum and at least a second transfer datum from transfer data.

4. The apparatus of claim 3, wherein identifying the first transfer datum comprises classifying the target datum to the first transfer datum.

5. The apparatus of claim 1, wherein the interface query data structure configures a remote display device to display the input field to the user.

6. The apparatus of claim 1, wherein generating the instruction set further comprises:
    classifying the client datum to one or more of the plurality of categories based on a pattern that is representative of client interaction with the user.

7. The apparatus of claim 1, wherein the client datum further comprises a pattern that is representative of client interactions.

8. The apparatus of claim 1, wherein generating the strategy recommendation further comprises a machine learning model.

9. The apparatus of claim 1, wherein generating the strategy recommendation further comprises a client relationship recommendation.

10. A method for generating an instruction set for a user, the method comprising:
    receiving, by a computing device, a client datum from a client device, wherein the client datum describes resources of the client device and a pattern that is representative of client interactions;
    receiving, by the computing device, a user datum from the user;
    classifying, by the computing device, the client datum and the user datum to a category of a plurality of categories;
    calculating, by the computing device, a target datum wherein the target datum identifies an optimum confidence level;
    generating, by the computing device, a transfer datum as a function of the optimum confidence level;
    wherein generating the transfer datum further comprises generating an interface query data structure including an input field based on ranking the first transfer datum and the at least a second transfer datum;
    receiving, by the computing device, at least a user-input datum into an input field, wherein the user-input datum describes data for selecting a preferred attribute of resource transfer data associated the transfer datum;
    displaying, by the computing device, an instruction set including displaying the first transfer datum based on the user-input datum wherein the instruction set is further configured to: generate a strategy recommendation as a function of at least the target datum wherein the strategy recommendation identifies a client relationship recommendation.

11. The method of claim 10, wherein classifying the client datum further comprises a client characteristic classification model wherein the client classification model classifies the client datum into at least a client character group.

12. The method of claim 10, wherein generating the transfer datum further comprises identifying a first transfer datum and at least a second transfer datum from transfer data.

13. The method of claim 12, wherein identifying the first transfer datum comprises classifying the target datum to the first transfer datum.

14. The method of claim 10, wherein the interface query data structure configures a remote display device to display the input field to the user.

15. The method of claim 10, wherein generating the instruction set further comprises:
    classifying the client datum to one or more of the plurality of categories based on the pattern that is representative of client interaction with the user.

16. The method of claim 10, wherein the client datum further comprises a pattern that is representative of client interactions.

17. The method of claim 10, wherein generating the strategy recommendation further comprises a machine learning model.

18. The method of claim 10, wherein generating the strategy recommendation further comprises a client relationship recommendation.

* * * * *